US010248898B2

United States Patent
Brown (10) Patent No.: US 10,248,898 B2
(45) Date of Patent: Apr. 2, 2019

(54) PASSIVE RFID DOOR LOCK

(71) Applicant: SPECTRUM BRANDS, INC., Middleton, WI (US)

(72) Inventor: Troy M. Brown, Aliso Viejo, CA (US)

(73) Assignee: Spectrum Brands, Inc., Middleton, WI (US)

(*) Notice: Subject to any disclaimer, the term of this patent is extended or adjusted under 35 U.S.C. 154(b) by 0 days.

(21) Appl. No.: 15/626,617

(22) Filed: Jun. 19, 2017

(65) Prior Publication Data

US 2018/0005097 A1 Jan. 4, 2018

Related U.S. Application Data

(60) Provisional application No. 62/356,209, filed on Jun. 29, 2016.

(51) Int. Cl.
*G06K 19/07* (2006.01)
*G06K 7/10* (2006.01)

(52) U.S. Cl.
CPC ..... *G06K 19/0723* (2013.01); *G06K 7/10128* (2013.01)

(58) Field of Classification Search
CPC ........... G06K 7/10128; G06K 19/0723; G07C 9/00571
See application file for complete search history.

(56) References Cited

U.S. PATENT DOCUMENTS

| 9,674,124 B1* | 6/2017 | Fisher ............... H04L 51/066 |
| 2012/0280783 A1* | 11/2012 | Gerhardt ........... G07C 9/00309 340/5.6 |
| 2013/0210360 A1 | 8/2013 | Ljung et al. |
| 2013/0293351 A1 | 11/2013 | Kuenzi et al. |
| 2014/0145823 A1* | 5/2014 | Aase ................ G07C 9/00309 340/5.61 |
| 2014/0191848 A1* | 7/2014 | Imes ................ H04B 5/0037 340/10.5 |
| 2014/0375421 A1 | 12/2014 | Morrison et al. |
| 2015/0027178 A1 | 1/2015 | Scalisi et al. |
| 2015/0040205 A1 | 2/2015 | Van Till et al. |
| 2015/0101369 A1 | 4/2015 | Scalisi |
| 2015/0170448 A1 | 6/2015 | Robfogel et al. |
| 2015/0199859 A1 | 7/2015 | Ouyang et al. |
| 2015/0269799 A1 | 9/2015 | Martinez et al. |

FOREIGN PATENT DOCUMENTS

KR 10-1470747 B1 12/2014

OTHER PUBLICATIONS

PCT Application No. PCT/US2017/039719;Written Opinion and International Search Report; dated Aug. 31, 2017.

* cited by examiner

*Primary Examiner* — Laura Gudorf
(74) *Attorney, Agent, or Firm* — Merchant & Gould P.C.

(57) ABSTRACT

An electronic or non-electronic lockset with a passive RFID tag operating methods and system is described herein. The passive RFID tag is affixed to or near the lockset. Using an application on a mobile device, a user can leverage the mobile device to enable features such as user notifications, home automation control, and home security control. A visitor to a home uses an application on their mobile device to scan the passive RFID to gain entry to a home through verification by a remote homeowner.

16 Claims, 6 Drawing Sheets

PASSIVE RFID DOOR LOCK

RELATED APPLICATIONS

This application claims the benefit of U.S. Provisional Application Ser. No. 62/356,209 filed Jun. 29, 2016 for a "Passive RFID Door Lock," which is hereby incorporated by reference in its entirety.

TECHNICAL FIELD

The present disclosure relates generally to locking devices; in particular, this disclosure relates to an electronic locking device operable with an affixed passive RFID tag.

BACKGROUND AND SUMMARY

Locking and security systems are in widespread use in residential and commercial markets. Locking and security systems control ingress through doors to secured areas, such as a building or other secured space, by requiring certain authorized credentials. Existing security systems may include electronic locks which may control mechanical locking assemblies, such as movement of a deadbolt between its extended and retracted positions. Existing security systems that include radio-frequency identification ("RFID") solutions in the form of RFID tag readers do not incorporate passive RFID tag solutions.

According to one aspect, this disclosure provides a system comprising a lockset for use with a mobile device. The system comprises a locking device, a passive radio frequency identification ("RFID") tag and a mobile device. The locking device is movable between a locked position and an unlocked position. The passive RFID tag is affixed to a housing of the locking device. The mobile device comprises a reader and is configured to: scan the passive RFID tag, automatically transmit one or more notifications, and update a cloud service.

According to another aspect, this disclosure provides a system with a locking device, a passive radio frequency identification ("RFID") tag, and a mobile device. The locking device is movable between a locked position and an unlocked position. The passive RFID tag is affixed to a housing of the locking device. The mobile device comprises a reader and is configured to: scan the passive RFID tag and issue one or more commands to a home automation controller.

BRIEF DESCRIPTION OF THE DRAWINGS

The detailed description makes reference to the accompanying figures in which.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, this disclosure relates to a door lock, either electric or non-electronic, that incorporates a passive RFID tag. The door lock offers RFID benefits without the use of an incorporated RFID tag reader. For example, the passive RFID tag can leverage a user's mobile device, such as a smart phone, a configurable application ("app"), and the Internet (or "cloud"). The passive RFID tag can be in sticker form, printed circuit board ("PCB") form, or other configurations. Embodiments are contemplated in which the computing processing power of a user's device may be leveraged to enable features that would otherwise not be available without more advanced wireless electronics incorporated into the door lock. The term "door lock" is broadly intended to be construed as encompassing any hardware associated with a door, including but not limited to a lock, a door lever, a door knob, a hinge, etc. In some embodiments, the passive RFID tag could be installed on a door separate from the door lock, such as in a nearby position.

Figure 1:
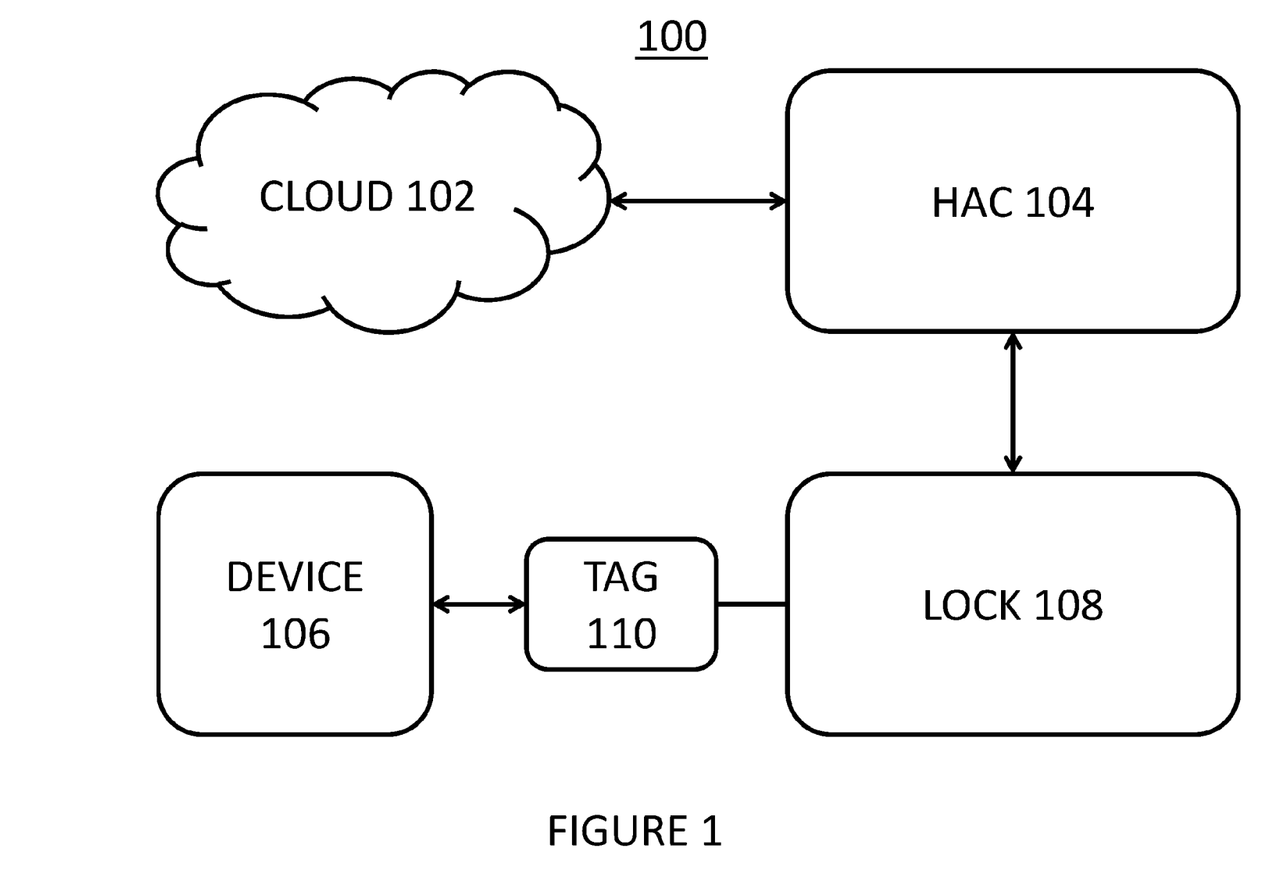
FIG. 1 is a simplified block diagram of an example system for operating the lock hardware according to an embodiment of this disclosure.

FIG. 1 shows an example system configuration 100 for at least one exemplary embodiment. In the example shown, the system includes a cloud server 102, a Home Automation Controller (HAC) 104, a user device 106, a tag 110, and a lock 108. The cloud server 102 may further comprise or be a part of a network, such as a local area network, wide area network, the Internet, or the like. The HAC 104 may be a home security system or automation system connected (wired or wirelessly) to other devices in around the dwelling associated with the lock 108. The HAC 108 may control the lock 108, and/or other devices (not shown). These devices may include, but are not limited to, lights, entertainment devices, or kitchen appliances, etc. The user device 106 may be a portable user device, such as a smartphone, cell phone, tablet computer, or the like.

Figure 2:
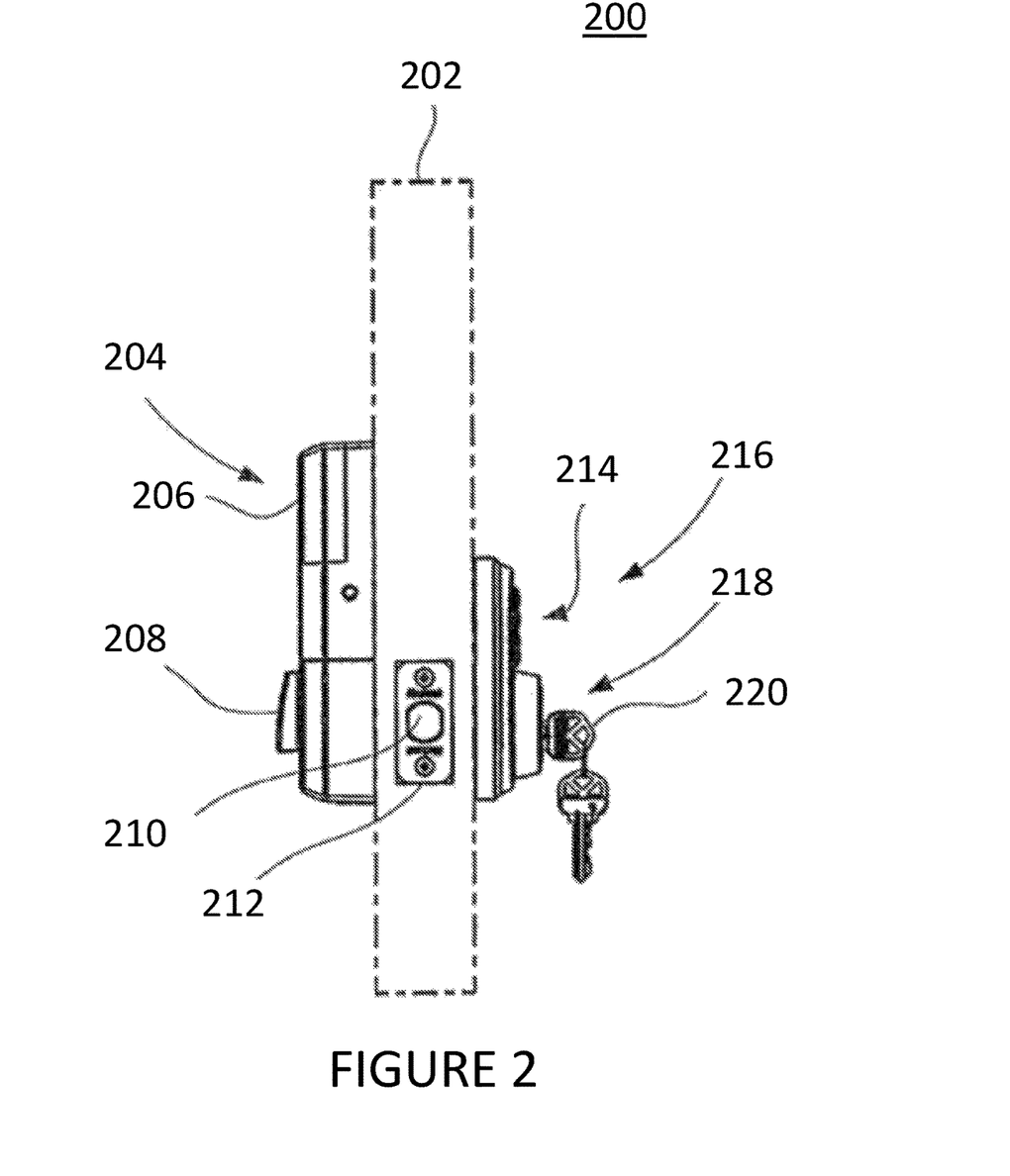
FIG. 2 is a side view of an electronic lock and corresponding hardware in accordance with an embodiment of the present disclosure, installed on a door and with the door shown in phantom lines.

FIG. 2 shows an exemplary lock 200, either electronic or non-electronic, mounted to a door 202. In the example shown, the lock 200 includes an interior assembly 204 with a battery holder 206, a turn-piece 208, a bolt 210, a strike 212, a user input 214, an exterior assembly 216, a mechanical locking assembly 218, and a key 220. The exterior assembly 216 may further comprise a passive RFID tag in sticker form, or the like. In some cases, credentials and/or commands may be provided wirelessly to the lock 200, such as disclosed in U.S. Pre-grant Pub. No. 2014/0250956 for an "Electronic Deadbolt" filed Feb. 25, 2014 and U.S. Pat. No. 9,024,759 for a "Wireless Lockset With Integrated Antenna, Touch Activation, and Light Communication Method," filed Mar. 10, 2014, which are hereby incorporated by reference.

Figure 3:
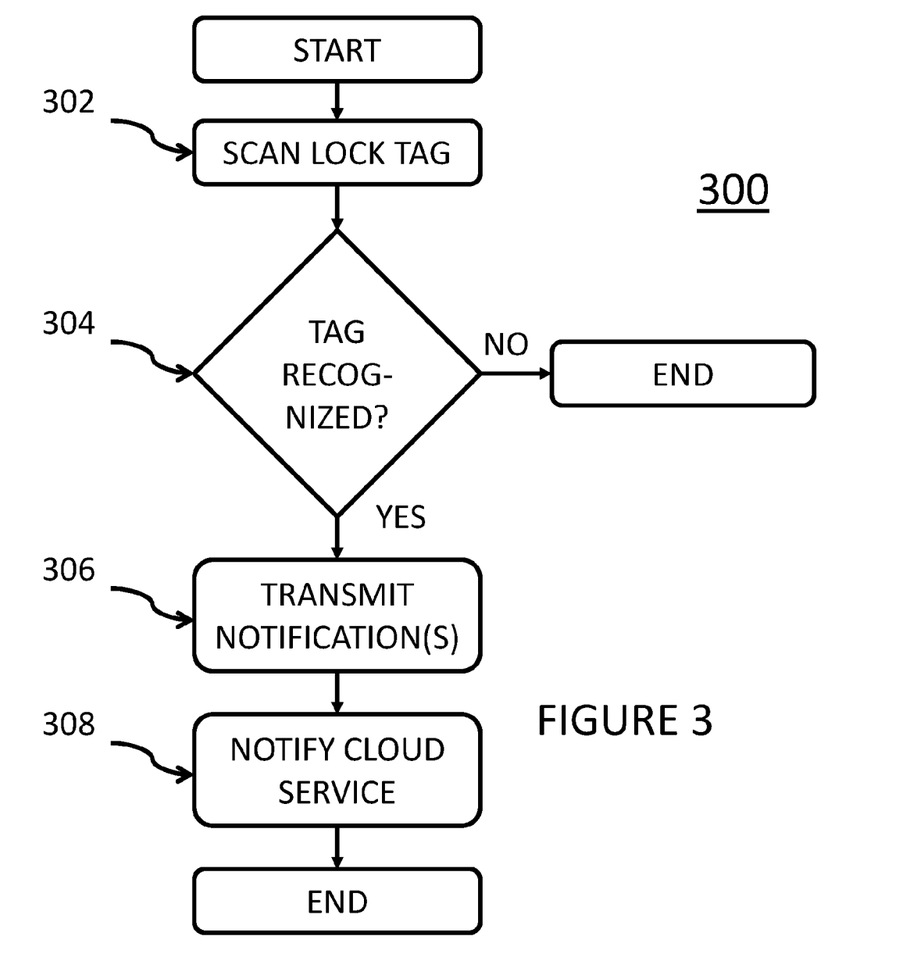
FIG. 3 is a flow diagram of an exemplary method of at least one embodiment of the disclosure.

FIG. 3 is a simplified flowchart showing an example notification process of use of the door using the software application on the user device 106. A user of the device may initiate the process via the software application. In this example, the method 300 begins with Block 302, in which a user scans the passive RFID tag affixed or in close proximity to the door lock. At Decision Block 304, the software application determines if the tag is recognized. If "NO," the process ends. If "YES," the method moves to Block 306 and notifications are sent automatically. Notifications sent include, but are not limited to, SMS text messages, e-mail, or the like. Notifications may also include social network status updates, such as a "tweet" on Twitter® or a status update on Facebook®. The update may be, for example, a status update of "Finally home!" or the like. Notifications to be sent may be pre-configured by the device user via the software application, or the like. The process then moves to Block 308 and a cloud service (i.e., Cloud 102 of FIG. 1) may be notified of the lock tag scan. A cloud service may be configured to track locks scanned along with other information, such as time scanned, audit trail information update, etc. Even further, the cloud service may trigger and/or issue other commands, such as a command to a home automation controller (i.e. HAC 104 of FIG. 1). The door use notification process is then considered complete and the process ends.

Figure 4:
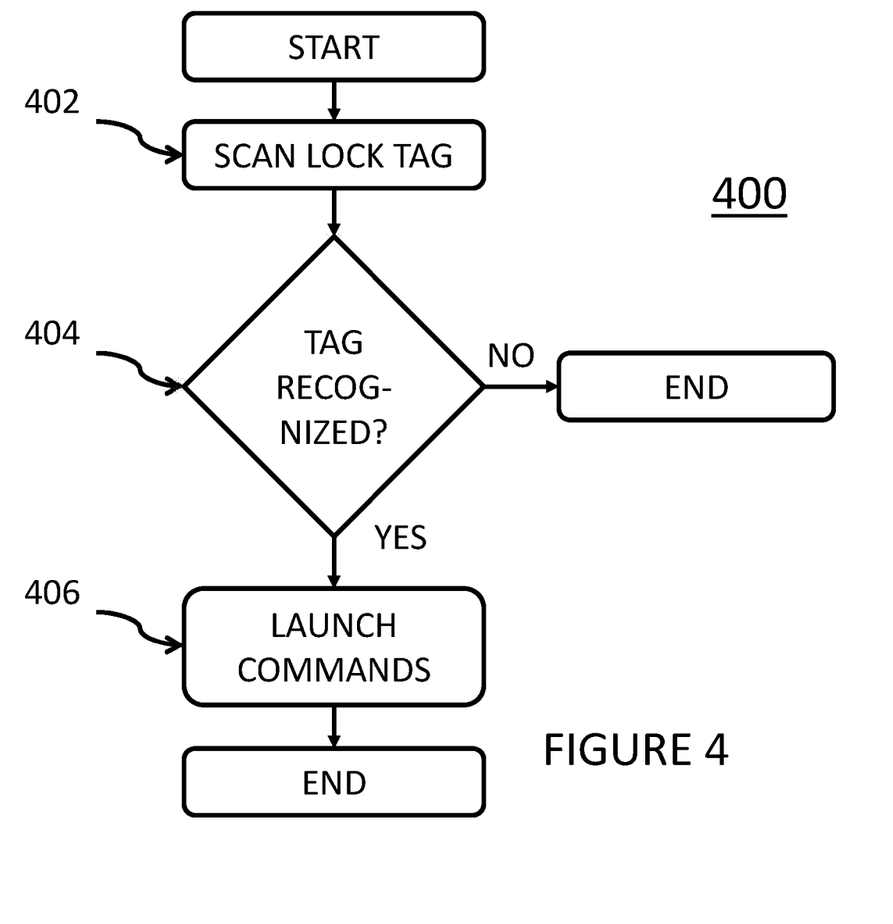
FIG. 4 is a flow diagram of an exemplary method of at least one embodiment of the disclosure.

FIG. 4 is a simplified flowchart showing an example home automation trigger process based on use of the door using the software application on the user device 106. A user of the device may initiate the process via the software application. In this example, the method 400 begins with Block 402, in which a user scans the passive RFID tag affixed or in close proximity to the door lock. At Decision Block 404, the software application determines if the tag is recognized. If "NO," the process ends. If "YES," the method moves to Block 406 and commands are launched, issued, or triggered. Commands may be issued via the user device or cloud service 102 to home automation controller (i.e., HAC 104 of FIG. 1). Commands issued could include, but are not limited to, disable burglar alarm, set Home Automation Scene to "Evening," and/or turn on or activate an appliance in the dwelling, such as a coffee maker to brew a pot of coffee. These non-limiting examples are considered exemplary of a myriad of different commands that may be issued to a Home Automation Controller, as is known to one of ordinary skill in the art based on differing capabilities of Home Automation Controllers in use today and beyond. The home automation trigger process is then considered complete and the process ends.

Figure 5:
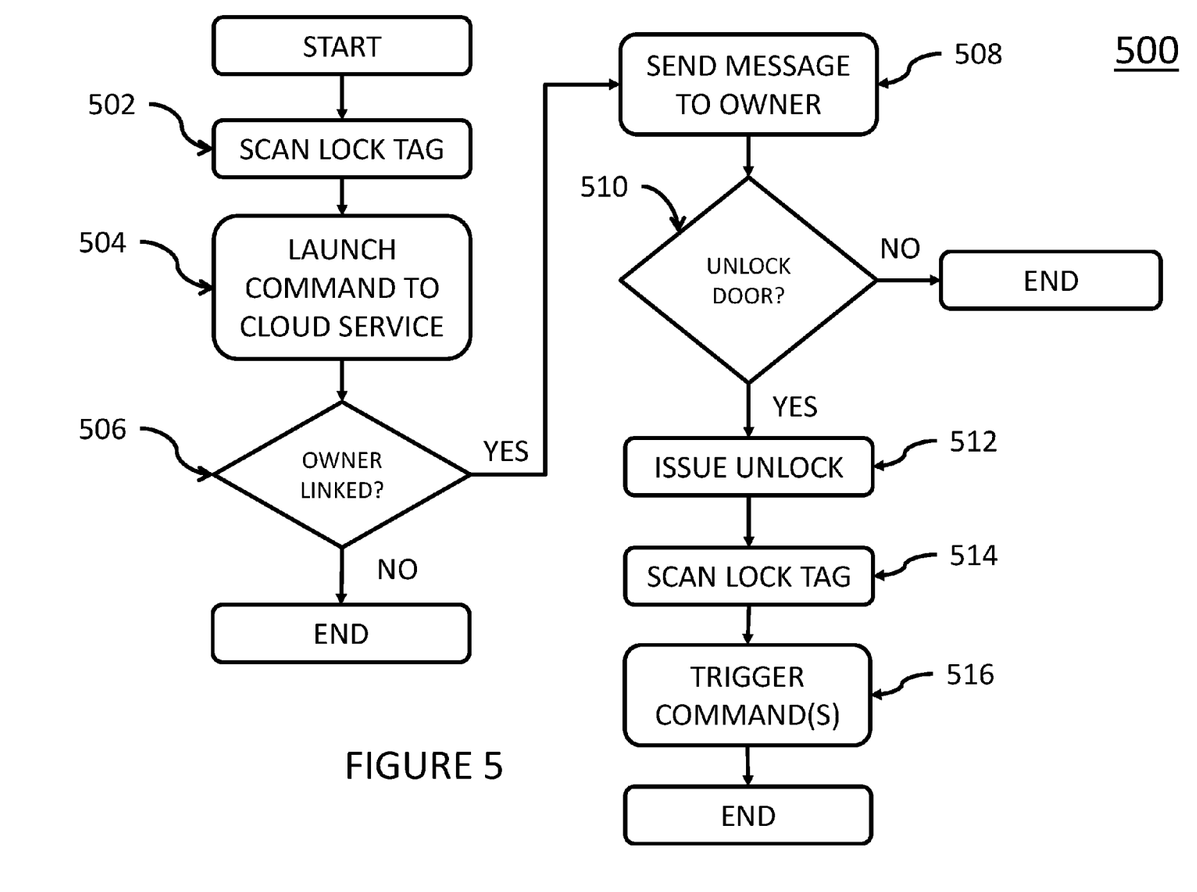
FIG. 5 is a flow diagram of an exemplary method of at least one embodiment of the disclosure.

FIG. 5 is a simplified flowchart showing an example home automation door unlock process based on use of the door by a visitor using the software application on the user device 106. A user of the device may initiate the process via the software application. In this example, the method 500 begins with Block 502, in which a user scans the passive RFID tag affixed or in close proximity to the door lock. At Block 504, a command is issued by the software application to a cloud service. At Decision Block 506, the cloud service determines whether a homeowner's account is linked to the RFID tag that was scanned. If "NO," the process ends. If "YES," the process moves to Block 508 and a message is sent to the homeowner. The message indicates that a visitor is present at the door. The message may be sent via text message, email, or the like. The message may include identifying information of the visitor and the homeowner issues verification information. At Decision Block 510, if a user does not verify the visitor, access is not granted, or do not unlock door, then "NO" and the process ends. If the user does verify and therefore "YES" to Decision Block 510, the process moves to Block 512 and the door is unlocked via the home automation controller 104. The homeowner may send verification via return message, such as via text message, email, or the like. The unlock message may be sent via the cloud service 102 and may include further commands, such as disable burglar alarm, or the like. At Block 514, the visitor may scan the lock tag upon leaving the premises. At Block 516, commands may be triggered via the software application. The commands include, but are not limited to, re-lock the door, re-arm the alarm system and/or transmit a verification message to the homeowner. The home automation door unlock process is then considered complete and the process ends.

Figure 6:
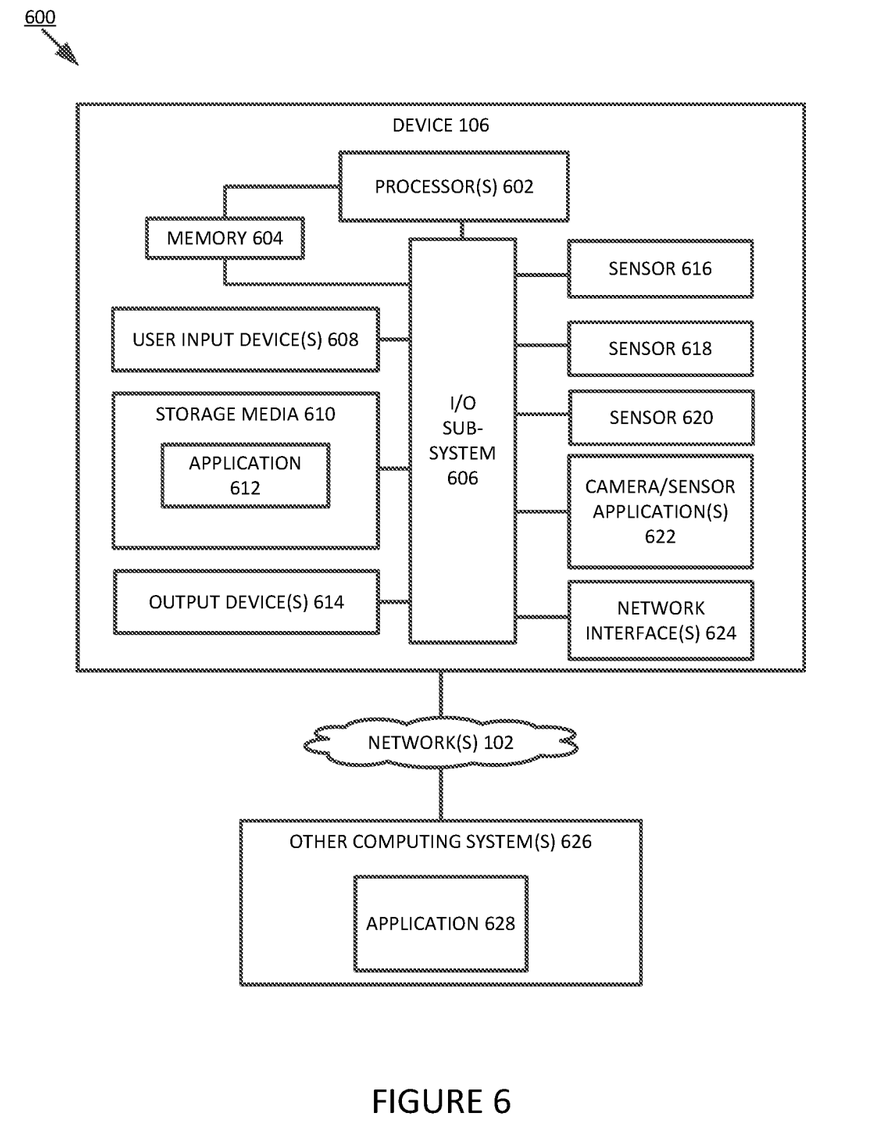
FIG. 6 is a simplified block diagram of an exemplary computing environment in connection with at least one embodiment of the lock assembly of FIG. 1.

Referring now to FIG. 6, a simplified block diagram of an exemplary computing environment 600 for the device 106, in which the door lockset application is realized, is shown. The illustrative implementation 600 includes a device 106, which may be in communication with one or more other computing systems or devices 626 via one or more networks 102. As shown, the device 106 comprises storage media 610.

The illustrative device 106 includes at least one processor 602 (e.g. a microprocessor, microcontroller, digital signal processor, etc.), memory 604, and an input/output (I/O) subsystem 606. Although not specifically shown, it should be understood that the I/O subsystem 606 may include, among other things, an I/O controller, a memory controller, and one or more I/O ports. The processor 602 and the I/O subsystem 606 are communicatively coupled to the memory 604. The memory 044 may be embodied as any type of suitable computer memory device (e.g., volatile memory such as various forms of random access memory).

The I/O subsystem 606 is communicatively coupled to a number of components including one or more user input devices 608 (e.g., a touchscreen, keyboard, virtual keypad, microphone, etc.), one or more storage media 610 that comprises a software application 612, one or more output devices 614 (e.g., speakers, LEDs, etc.), one or more sensing devices 616, 618, 620, one or more camera or other sensor applications 622 (e.g., software-based sensor controls), and one or more network interfaces 624.

The storage media 610 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.). Portions of systems software or framework/middleware may be copied to the memory 604 during operation of the computing device 106, for faster processing or other reasons.

The one or more network interfaces 624 may communicatively couple the computing device 106 to a network, such as a local area network, wide area network, personal cloud, enterprise cloud, public cloud, and/or the Internet, for example. Accordingly, the network interfaces 624 may include one or more wired or wireless network interface cards or adapters, for example, as may be needed pursuant to the specifications and/or design of the particular computing system 600. The network interface(s) 624 may provide short-range wireless or optical communication capabilities using, e.g., Near Field Communication (NFC), wireless fidelity (Wi-Fi), radio frequency identification (RFID), infrared (IR), or other suitable technology. Further, the wireless communications may use the Zigbee or Z-Wave protocols.

The other computing system(s) 626 may be embodied as any suitable type of computing system or device such as any of the aforementioned types of devices or other electronic devices or systems. For example, in some embodiments, the other computing systems 626 may include one or more server computers used to store portions of the data stored in storage media 610. Further, computing device 626 may further include application 628 to provide an interface for display to a user to implement the embodiments of the disclosure set forth. The computing system 600 may include other components, sub-components, and devices not illustrated in FIG. 6 for clarity of the description. In general, the components of the computing system 600 are communicatively coupled as shown in FIG. 6 by electronic signal paths, which may be embodied as any type of wired or wireless signal paths capable of facilitating communication between the respective devices and components.

Examples

Illustrative examples of the passive RFID lock disclosed herein are provided below. An embodiment of the passive RFID lock may include any one or more, and any combination of, the examples described below.

Example 1 is a system comprising a lockset for use with a mobile device. The system comprises a network, a locking device, a passive radio frequency identification ("RFID") tag and a mobile device. The locking device is movable between a locked position and an unlocked position. The passive RFID tag is affixed to a housing of the locking device. The mobile device comprises a reader and is configured to: scan the passive RFID tag, automatically transmit one or more notifications, and update a cloud service.

In Example 2, the subject matter of Example 1 is further configured to include a home automation control device communicatively coupled to the mobile device and configured to perform one or more actions based on a message received from the mobile device.

In Example 3, the subject matter of Example 1 is further configured such that the one or more notifications are automatically transmitted in response to the passive RFID tag being recognized by a software application of the mobile device.

In Example 4, the subject matter of Example 3 is further configured such that the one or more notifications include a text message or an email.

In Example 5, the subject matter of Example 3 is further configured such that the one or more notifications include a social network status update.

In Example 6, the subject matter of Example 1 is further configured such that the cloud service tracks scan time.

In Example 7, the subject matter of Example 1 is further configured such that the cloud service tracks audit trail information.

In Example 8, the subject matter of Example 1 is further configured such that the cloud service issues one or more additional commands based on the lock scan.

In Example 9, the subject matter of Example 8 is further configured such that the one or more additional commands include a command issued to a home automation controller.

In Example 10, the subject matter of Example 1 is further configured such that the reader is a near-field communications (NFC) reader.

Example 11 is a system comprising a lockset for use with a mobile device. The system comprises a network, a locking device, a passive radio frequency identification ("RFID") tag, and a mobile device. The locking device is movable between a locked position and an unlocked position. The passive RFID tag is affixed to a housing of the locking device. The mobile device comprises a reader and is configured to: scan the passive RFID tag and issue one or more commands to a home automation controller.

In Example 12, the subject matter of Example 11 is further configured such that the one or more commands are issued via a cloud service.

In Example 13, the subject matter of Example 11 is further configured such that the one or more commands cause one or more appliances to perform one or more operations.

In Example 14, the subject matter of Example 13 is further configured such that the one or more appliances are communicatively coupled to the home automation controller.

In Example 15, the subject matter of Example 11 is further configured such that the reader is a near-field communications (NFC) reader.

Example 16 is a system comprising a lockset for use with a mobile device. The system comprises a network, a locking device, a passive radio frequency identification ("RFID") tag, and a mobile device. The locking device is movable between a locked position and an unlocked position. The passive RFID tag is affixed to a housing of the locking device. The mobile device comprises a reader and is configured to: scan the passive RFID tag and launch a command to a cloud service. The locking device is unlocked in response to receiving a verification from an owner of the locking device via the cloud service.

In Example 17, the subject matter of Example 16 is further configured such that the verification is an authorization of a user of the mobile device.

In Example 18, the subject matter of Example 16 is further configured such that the locking device is locked and a notification is transmitted to the owner in response to a subsequent scan of the passive RFID tag by the mobile device.

In Example 19, the subject matter of Example 16 is further configured such that the verification is received via a text message.

In Example 20, the subject matter of Example 16 is further configured such that the reader is a near-field communications (NFC) reader.

What is claimed is:

1. A system comprising:
   a locking device movable between a locked position and an unlocked position;
   a passive radio frequency identification ("RFID") tag affixed to a housing of the locking device; and
   a mobile device comprising a reader, the mobile device configured to:
      scan the passive RFID tag;
      automatically transmit one or more notifications; and
      update a cloud service;
      wherein the one or more notifications are automatically transmitted in response to the passive RFID tag being recognized by a software application of the mobile device; and
      wherein the cloud service issues one or more additional commands based on the scan of the RFID tag, the one or more additional commands including a command issued from the cloud service to a home automation controller.

2. The system of claim 1, further comprising a home automation control device communicatively coupled to the mobile device and configured to perform one or more actions based on a message received from the mobile device.

3. The system of claim 1, wherein the one or more notifications include a text message and/or an email.

4. The system of claim 1, wherein the one or more notifications include a social network status update.

5. The system of claim 1, wherein the cloud service tracks scan time.

6. The system of claim 1, wherein the cloud service tracks audit trail information.

7. The system of claim 1, wherein the reader is a near-field communications (NFC) reader.

8. A system comprising:
   a locking device movable between a locked position and an unlocked position;
   a passive radio frequency identification ("RFID") tag affixed to a housing of the locking device; and
   a mobile device comprising a reader, the mobile device configured to:
      scan the passive RFID tag using the reader;
      issue one or more commands to a home automation controller via a cloud service; and
      automatically transmit one or more notifications in response to the passive RFID tag being recognized by a software application of the mobile device.

9. The system of claim 8, wherein the one or more commands cause one or more appliances to perform one or more operations.

10. The system of claim 9, wherein the one or more appliances are communicatively coupled to the home automation controller.

11. The system of claim 8, wherein the reader is a near-field communications (NFC) reader.

12. A system comprising:
    a locking device movable between a locked position and an unlocked position;
    a passive radio frequency identification ("RFID") tag affixed to a housing of the locking device; and
    a mobile device comprising a reader, the mobile device configured to:
       scan the passive RFID tag;
       launch a command to a cloud service; and
       automatically transmit one or more notifications in response to the passive RFID tag being recognized by a software application of the mobile device;
       wherein the locking device is unlocked in response to receiving a verification from an owner of the locking device via the cloud service; and
    wherein the cloud service issues one or more additional commands based on the scan of the RFID tag, the one or more additional commands including a command issued from the cloud service to a home automation controller.

13. The system of claim 12, wherein the verification is an authorization of a user of the mobile device.

14. The system of claim 12, wherein the locking device is locked and a notification is transmitted to the owner in response to a subsequent scan of the passive RFID tag by the mobile device.

15. The system of claim 12, wherein the verification is received via text message.

16. The system of claim 12, wherein the reader is a near-field communications (NFC) reader.

* * * * *

UNITED STATES PATENT AND TRADEMARK OFFICE
CERTIFICATE OF CORRECTION

PATENT NO. : 10,248,898 B2
APPLICATION NO. : 15/626617
DATED : April 2, 2019
INVENTOR(S) : Brown It is certified that error appears in the above-identified patent and that said Letters Patent is hereby corrected as shown below:

In the Specification

Column 4, Line 63: "The memory 044 may be" should read --The memory 604 may be--

In the Claims

Column 7, Line 30, Claim 2: "further comprising a home" should read --wherein the home--

Column 7, Line 31, Claim 2: "automation control device communicatively" should read --automation controller is communicatively--

Signed and Sealed this
Fifteenth Day of October, 2019

Andrei Iancu
*Director of the United States Patent and Trademark Office*